(12) United States Patent
Lavie

(10) Patent No.: US 10,564,618 B2
(45) Date of Patent: Feb. 18, 2020

(54) TIME CONTROLLED SWITCH

(71) Applicant: Bar-Ore Computers Ltd., Maale Shomron (IL)

(72) Inventor: Natan Lavie, Maale Shomron (IL)

(73) Assignee: Bar-Ore Computers Ltd., Maale Shomron (IL)

( * ) Notice: Subject to any disclaimer, the term of this patent is extended or adjusted under 35 U.S.C. 154(b) by 449 days.

(21) Appl. No.: 14/157,843

(22) Filed: Jan. 17, 2014

(65) Prior Publication Data
US 2014/0200730 A1 Jul. 17, 2014

(30) Foreign Application Priority Data
Jan. 17, 2013 (IL) .......................................... 224299

(51) Int. Cl.
*G05D 3/12* (2006.01)
*G05B 19/07* (2006.01)

(52) U.S. Cl.
CPC .................................... *G05B 19/07* (2013.01)

(58) Field of Classification Search
CPC ...................................................... G05B 19/07
See application file for complete search history.

(56) References Cited

U.S. PATENT DOCUMENTS

| | | | | |
|---|---|---|---|---|
| 5,808,278 A * | 9/1998 | Moon | ..................... | A47G 33/00 200/43.01 |
| 6,066,837 A * | 5/2000 | McCormick | ............ | F24C 7/087 219/506 |
| 2003/0026099 A1 * | 2/2003 | Dutka | ..................... | A47G 33/00 362/283 |
| 2003/0066827 A1 * | 4/2003 | Daum | ..................... | F24C 7/082 219/492 |
| 2006/0180179 A1 * | 8/2006 | Roderer | .............. | A47L 15/0021 134/18 |
| 2007/0103887 A1 * | 5/2007 | Bleier | ..................... | H01H 13/18 362/92 |
| 2007/0158335 A1 * | 7/2007 | Mansbery | ............... | F24C 7/082 219/505 |
| 2007/0217404 A1 * | 9/2007 | Kawamata | ............. | H05B 37/02 370/360 |
| 2007/0261561 A1 * | 11/2007 | Grossbach | .......... | F24D 17/0031 99/275 |
| 2009/0050458 A1 * | 2/2009 | Tukachinsky | ......... | G04C 23/48 200/35 R |

(Continued)

*Primary Examiner* — Adam Lee
(74) *Attorney, Agent, or Firm* — Mark M. Friedman

(57) ABSTRACT

A time controlled electrical switch operable in a Sabbath state and in a working day state, comprising a switching component for selectively directing the supply of electrical power, or for selectively transmitting a logical input, to a device; a memory device in which is stored local sunset information, calendar information, and predetermined rules for initiating a state changing event relating to a Sabbath state and a working day state; a logical circuit in data communication with the switching component, and a time supplying device. The logical circuit is operable to transmit a signal to the switching component for initiating the state changing event in response to an instantaneous time indicated by the time supplying device and the stored local sunset information, calendar information, and predetermined rules.

11 Claims, 5 Drawing Sheets

(56) References Cited

U.S. PATENT DOCUMENTS

| | | | |
|---|---|---|---|
| 2009/0167098 A1* | 7/2009 | Kalatizadeh | H03K 17/94 307/116 |
| 2009/0195349 A1* | 8/2009 | Frader-Thompson | G01D 4/002 340/3.1 |
| 2012/0038478 A1* | 2/2012 | Haviv | E05B 17/22 340/540 |
| 2012/0181266 A1* | 7/2012 | Frommer | F24C 3/12 219/492 |
| 2012/0223661 A1* | 9/2012 | Bloch | H05B 37/0281 315/360 |
| 2013/0126277 A1* | 5/2013 | Friedman | B66B 3/00 187/384 |
| 2013/0170324 A1* | 7/2013 | Tu | G04G 21/08 368/28 |
| 2014/0031898 A1* | 1/2014 | Litvak | A61N 1/08 607/57 |
| 2014/0327501 A1* | 11/2014 | Cohen | H01H 3/161 335/39 |

\* cited by examiner

TIME CONTROLLED SWITCH

CROSS-REFERENCE TO RELATED APPLICATION

This application claims the priority of Israeli Patent Application No. 224299, filed Jan. 17, 2013, which is incorporated herein by reference in its entirety.

FIELD OF THE INVENTION

The present invention relates to the field of electrical switching devices. More particularly, the invention relates to a time controlled switch, particularly one that is controlled with respect to the onset and conclusion of the Sabbath and other Jewish holy days.

BACKGROUND OF THE INVENTION

Some prior art switches are used for switching a connection state of an electrically powered device which is operable in a first state during a normal working day and in a second state during the Sabbath. According to the Jewish religion, it is forbidden to initiate the flow of current within a circuit, such as by manually turning on a light or any electrical appliance, during the Jewish Sabbath or any other holy day (hereinafter the "Sabbath"). Various electrically powered devices such as elevators and electric urns are equipped with a circuit which, when set to the second state, enable operation during the Sabbath without violation of the religious restrictions, although in a different fashion than the operation during a working day.

Before the onset of the Sabbath, a time which generally changes each week due to a change in the position of the Earth relative to the sun, the connection state of these prior art switches have to be changed by a time consuming procedure often involving a change in wiring connections in order to enable the Sabbath compliant operation. Similarly, the connection state of these switches has to be returned to the original state upon conclusion of the Sabbath in order to enable normal operation during working days.

It is an object of the present invention to provide a time controlled switch that can be automatically and reliably reconfigured from a Sabbath state to a working day state, and vice versa.

Other objects and advantages of the invention will become apparent as the description proceeds.

SUMMARY OF THE INVENTION

The present invention provides a time controlled electrical switch operable in a Sabbath state and in a working day state, comprising a switching component for selectively directing the supply of electrical power, or for selectively transmitting a logical input, to a device, a memory device in which is stored local sunset information, calendar information, and predetermined rules for initiating a state changing event relating to a Sabbath state and a working day state, a logical circuit in data communication with said switching component, and a time supplying device, wherein said logical circuit is operable to transmit a signal to said switching component for initiating said state changing event, in response to an instantaneous time indicated by said time supplying device and said stored local sunset information, calendar information, and predetermined rules.

In one aspect, the logical circuit is a processor comprising the memory device and the time supplying device is in data communication with said processor.

In one embodiment, the switch further comprises a communication unit for communicating with a remote server and for thereby retrieving updated information relating to one or more of the instantaneous time, sunset information, calendar information, and predetermined rules with respect to a present location of the switch, said updated information being transmittable to, and storable in, the processor. The communication unit may also comprise a component that is operable to communicate with a position indicating system for defining the present location of the switch and thereby the sunset and predetermined rules for said present location.

In one embodiment, the memory device is a memory device of an external computing device in data communication with the switch. The time supplying device may be in data communication with the external computing device or with the logical circuit.

In one aspect, the switch is configured with a port through which updated information relating to one or more of the instantaneous time, sunset information, calendar information, and predetermined rules is transmittable to, and storable in, the processor.

In one aspect, the time supplying device is a timer housed within a casing of the switch.

In one aspect, the switch further comprises a pushbutton for changing a mode of the switch, upon being depressed, from a normal mode to an automatic mode during which the logical circuit is operable to initiate a state changing event, or from said automatic mode to said normal mode.

In one aspect, the switching component is a relay.

DETAILED DESCRIPTION OF PREFERRED EMBODIMENTS

The present invention is a novel time controlled switch that becomes automatically reconfigured from a Sabbath state to a working day state, or from a working day state to a Sabbath state, in response to sunset time information for the local geographic location and for the given day.

Figure 1:
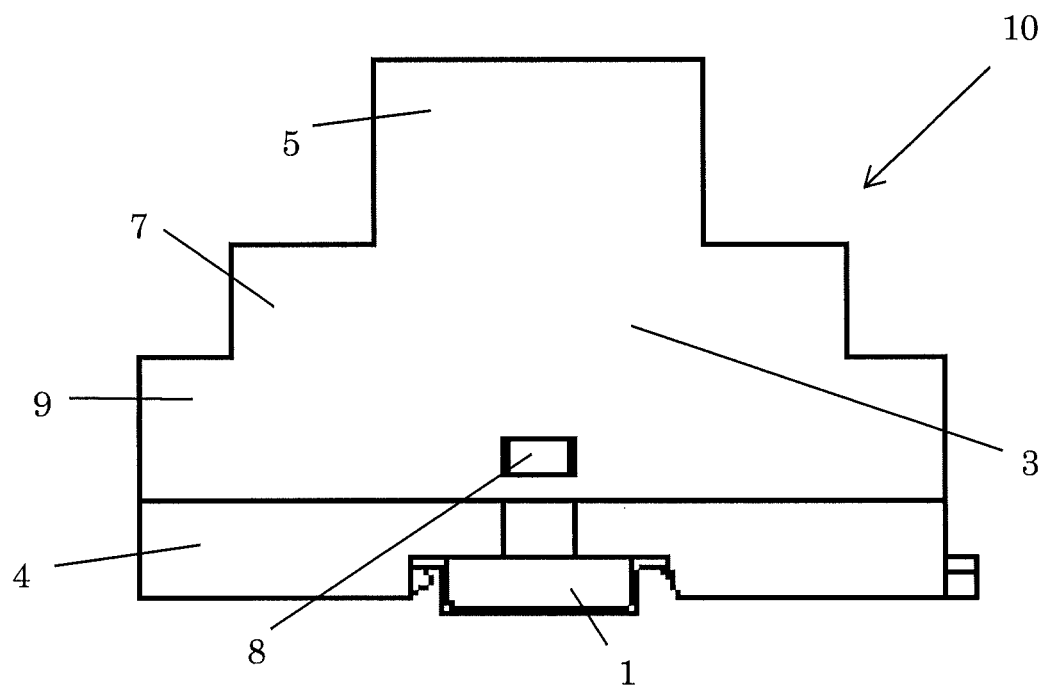
FIG. 1 is a side view of a time controlled switch according to one embodiment of the present invention.

FIG. 1 illustrates a side view of a time controlled switch according to one embodiment of the present invention, which is generally indicated by numeral 10. The switching and control components of time controlled switch 10 are housed within casing 3. Casing 3 is shown to be multi-leveled; however, it will be appreciated that any other configuration is also within the scope of the invention. A mounting member 4 may be detachably connected to casing 3 by means of flexible clip 8.

A panel module for facilitating operator related activities is housed within outer central portion 5. Within intermediate level portion 7 which is longer than, and located inwardly from, upper portion 5 is housed a circuit board comprising control components including a microprocessor, which are in data communication with the panel module. Within inner level portion 9 which is longer than, and located inwardly from, intermediate level portion 7 is housed a circuit board comprising switching circuitry which is also in data communication with the control components.

Mounting member 4 which is positionable in abutting relation with inner level portion 9 and may be of the same length, is provided with an inner recessed portion 6, in order to accommodate placement of a DIN rail 1 on which mounting member 4, as well as a circuit breaker, is mounted. Switch 10 may be mounted in any other desired fashion.

Figure 2:
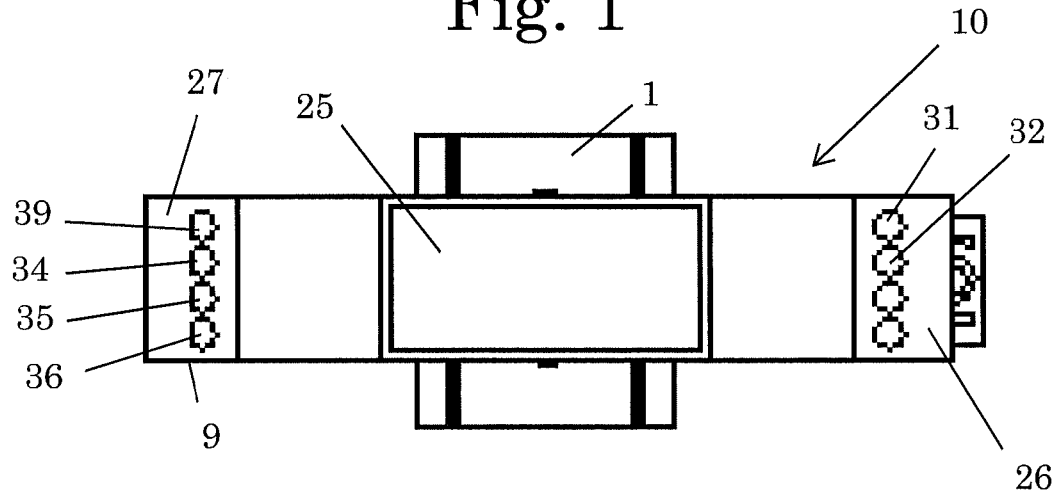
FIG. 2 is a front view of the switch of FIG. 1.

FIG. 2 illustrates a front view of switch 10. Panel 25 is centrally located so as to be easily accessible to an operator. By pressing a pushbutton protruding from panel 25, switch 10 may be set to an automatic mode whereby a connection state will be reconfigured at a predetermined time. When the pushbutton is pressed again, switch will be set to a normal mode whereby the switching state remains unchanged. Switch 10 is configured such that its current mode is assured of continuing after being set and remaining unaffected by a power failure. Panel 25 may be provided with a first indicator light for indicating the current mode of the switch and with a second indicator light for indicating when the switch is reconfigured to the Sabbath state. For example, the first indicator light may illuminate during the automatic mode and the second indicator light may blink 15 minutes before initiation of the Sabbath state and remain illuminated throughout the Sabbath.

Terminal modules 26 and 27 are provided at the two longitudinal ends, respectively, of inner level portion 9. Terminals 31 and 32 of module 26, e.g. screw terminals, may be used for connection to an external voltage source, such as alternating current (AC) mains voltage or direct current (DC) voltage. Terminals 34-36 of module 27 may be used for connection to an electrically powered device. The electrically powered device may be connected to switch by terminals 34 and 35 during the working day state and by terminals 34 and 36 during the Sabbath state.

Figure 3:
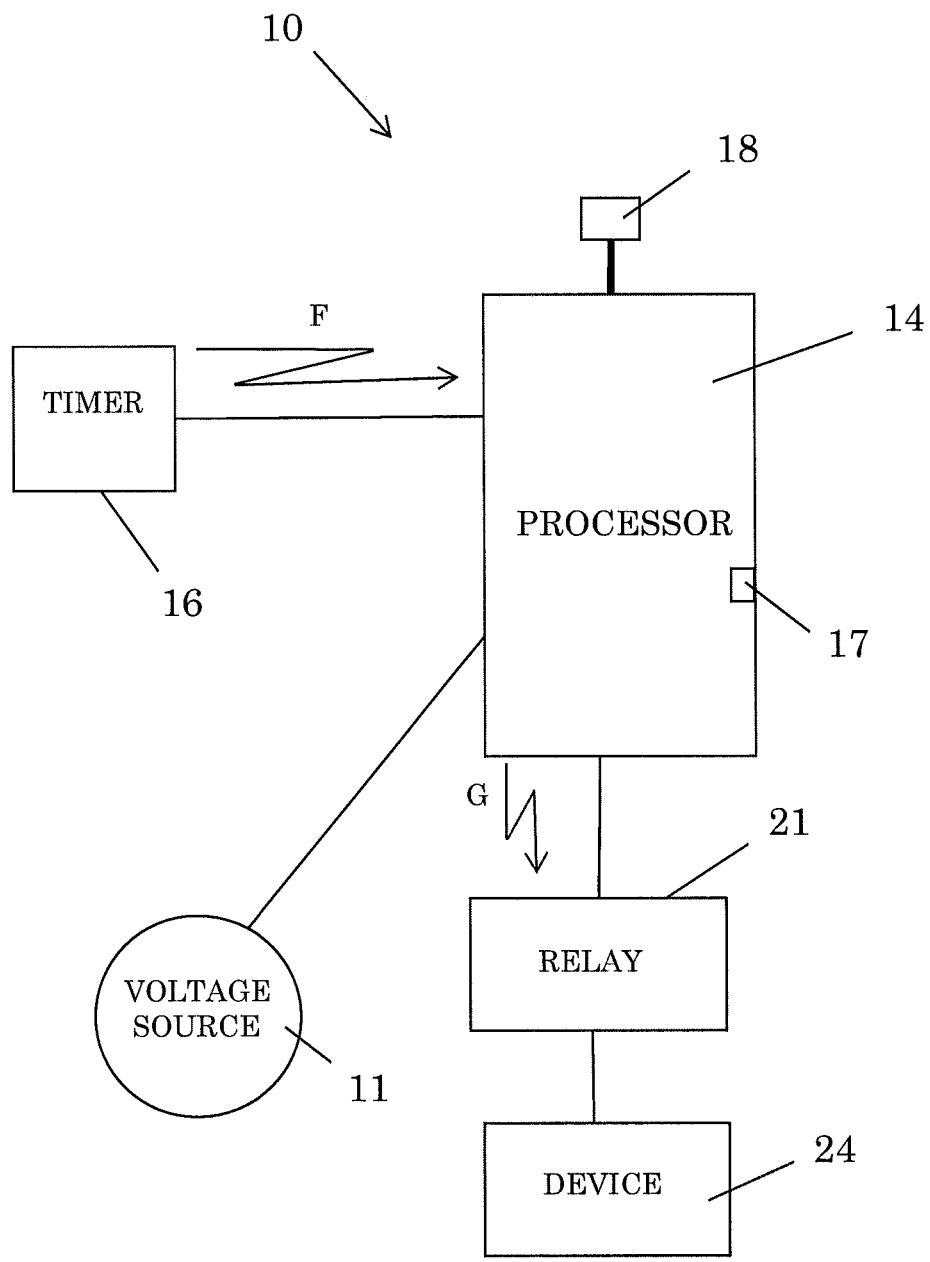
FIG. 3 is a block diagram of the switch of FIG. 1.

FIG. 3 schematically illustrates time controlled switch 10 to which is applied voltage from voltage source 11, for performing a mode changing event by means of relay 21 in electrical communication with electrically powered device 24.

Switch 10 comprises a processor 14 in which is stored sunset information for the local geographical location of the switch, calendar information indicating the date of the Sabbath and other holy days for a given year, and predetermined rules for initiating the Sabbath state at a predetermined time prior to sunset at the onset of a given Sabbath or holy day and for terminating the Sabbath state at a predetermined time after sunset at the conclusion of a given Sabbath or holy day. Processor 14 is in data communication with accurate battery powered timer 16 for indicating when to perform a state changing event.

The predetermined rules generally include, but are not limited to, the period of time prior to sunset which is accepted by the local municipality for setting the onset of the Sabbath and the period of time after sunset which is accepted by the local municipality for setting the conclusion of the Sabbath. The sunset information, calendar information, and predetermined rules may be factory installed into processor 14.

When pushbutton 18 is first depressed, processor 14 in communication therewith is set to the automatic mode, to enable reception of signals from timer 16. After timer 16 transmits a first signal F to processor 14 which is indicative that a mode changing event should be performed, processor 14 transmits a second signal G to relay 21, whereupon relay 21 changes the terminal connections of module 27.

Figure 4:
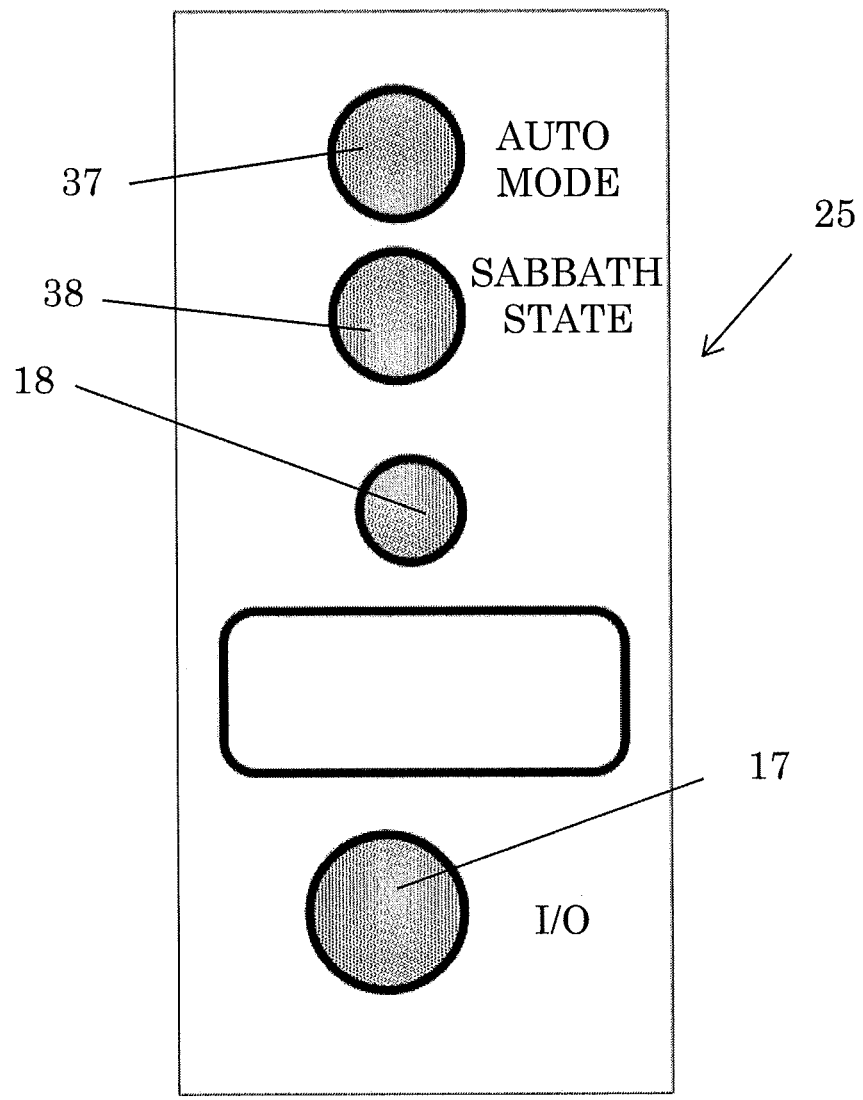
FIG. 4 is a front view of an operator interfaceable panel for use in conjunction with another embodiment of the invention.

Alternatively, as shown in FIG. 4, the predetermined rules, time information, calendar information, and/or sunset information may be locally input into the processor via input/output (I/O) port 17 provided with panel 25, for example to correct information during onset of daylight savings time or upon initial installation of the switch. Information stored within the processor may be retrieved via I/O port 17 and reviewed. Automatic mode indicator light 37 and Sabbath state indicator light 38 are mounted within panel 25.

Figure 5:
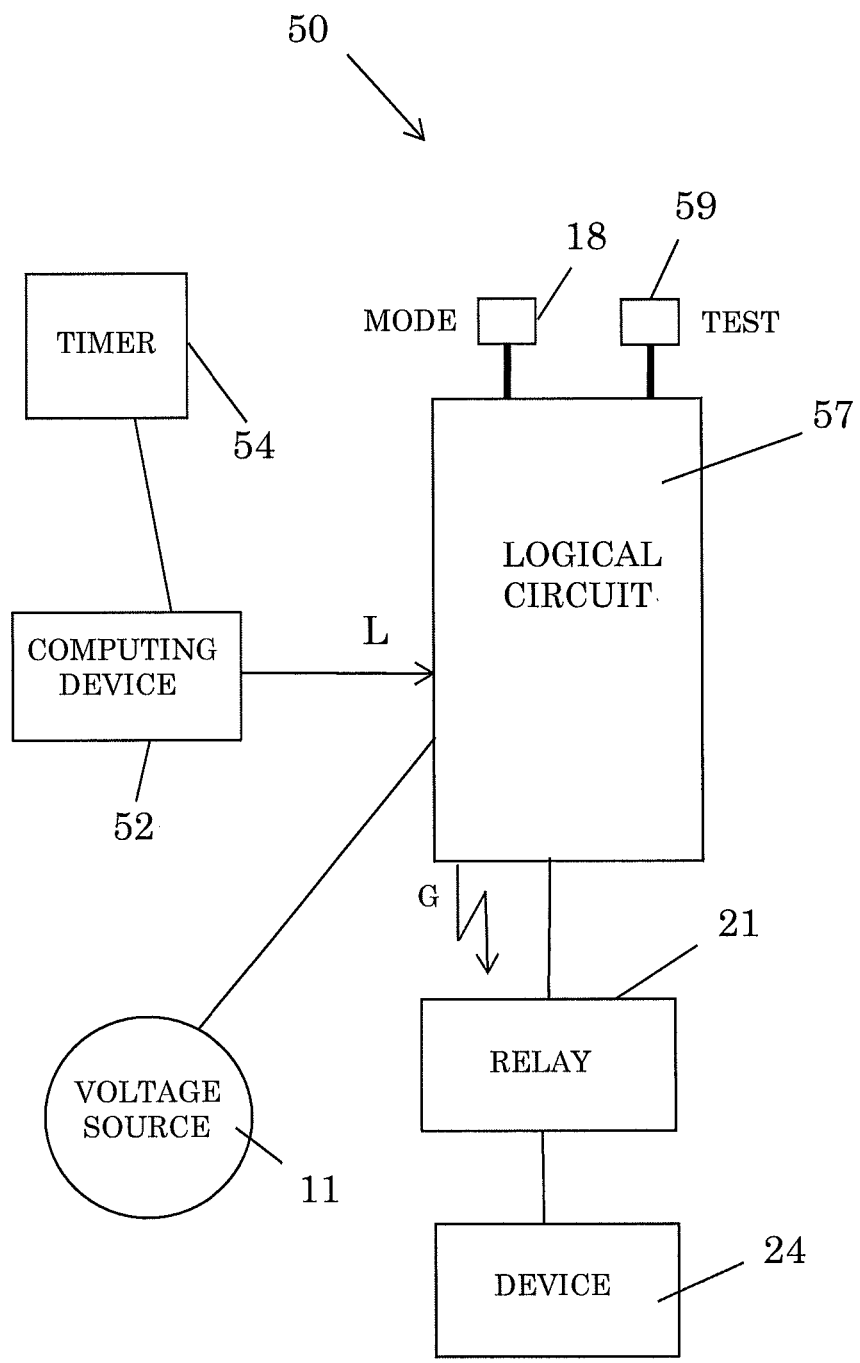
FIG. 5 is a block diagram of a switch according to another embodiment of the invention.

In the embodiment illustrated in FIG. 5 of a time controlled switch 50, the time information, sunset information, calendar information, and predetermined rules are stored in the memory device of an external computing device 52 in data communication therewith. Computing device 52 may transmit a logical input L via terminal 39 (FIG. 2) in response to the instantaneous time indicated by timer 54 and the stored local sunset information, calendar information, and predetermined rules, as an indication that a state changing event should be performed. Timer 54 may be provided internally within computing device 52. A logical circuit 57 housed within switch 50 transmits a signal G to relay 21 for initiating the state changing event after logical input L is received. A test button 59 connected to logical circuit 57 may be depressed to simulate a state changing event. It will be appreciated that any embodiment of the time controlled switch described herein may be provided with test button 59.

Figure 6:
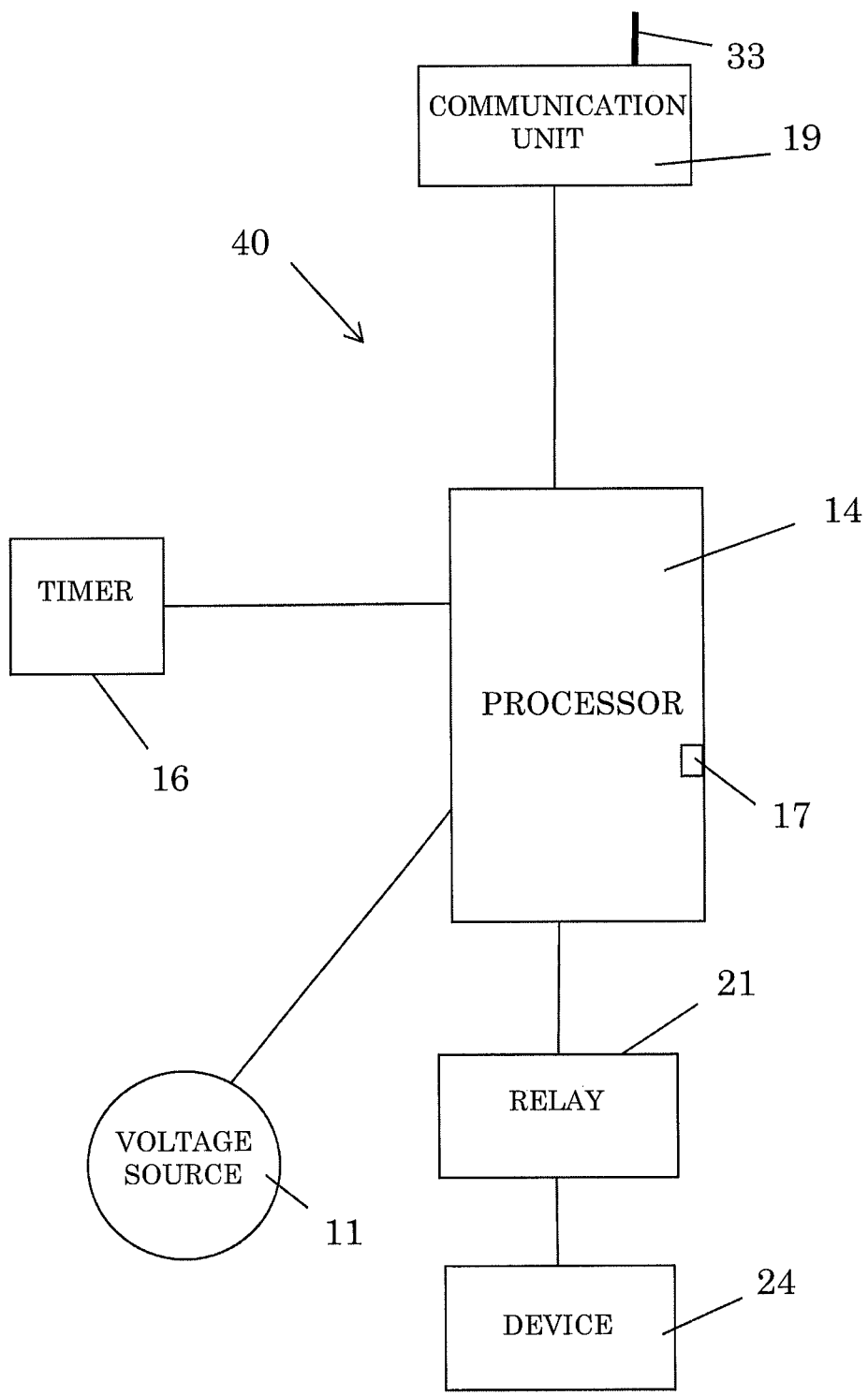
FIG. 6 is a block diagram of a switch according to another embodiment of the invention.

In the embodiment illustrated in FIG. 6 of a time controlled switch 40, the time information, sunset information, calendar information, and predetermined rules may be remotely updated by means of communication unit 19 comprising a transceiver 33 in communication with a global positioning system (GPS) or satellite system for defining a present location and with a remote server for supplying the updated information with respect with the defined present location by any communication means well known to those skilled in the art. The received updated information is then transmitted by communication unit 19 to processor 14, whereupon it is stored in the memory device thereof.

By virtue of the switch of the present invention, an electrically powered device 24 may be automatically switched to the Sabbath state or to the working day state at the correct time without being involved with the aggravation of having to change wiring connections. Not only are the time information regarding the onset and conclusion of every Sabbath are preprogrammed for many years in advance, but also the time information regarding the onset and conclusion of every holy day occurring at different times throughout the year, during which it is forbidden to initiate the flow of current within a circuit, may also be preprogrammed for many years in advance.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:
1. A time controlled electrical switch comprising:
   a switching component configured for:

at least one of: 1) selectively directing a supply of electrical power or 2) selectively transmitting a logical input, to a device external to the time controlled electrical switch over electrical connections between the switching component and the external device, and controlling the electrical connections such that the at least one of the: 1) selectively directed supply of electrical power, or 2) the selectively transmitted logical input, are indicators to the external device of either a Sabbath state or a working day state;

a processor in data communication with the switching component, the processor configured for applying predetermined rules for determining times for initiating a state changing event associated with the Sabbath state and the working day state;

a communication unit in data communication with the processor, the communication unit configured to receive timing information, calendar information, a geographic location of the time controlled electrical switch, and the predetermined rules; and a time supplying device in data communication with the processor, the time supplying device configured for sending a current time to the processor such that the processor transmits a signal to the switching component for initiating the state changing event in the switching component, from one of the Sabbath state to the working day state, or the working day state to the Sabbath state, based on the current time, the timing information, the calendar information, the geographic location of the time controlled electrical switch, and the predetermined rules, wherein the switching component automatically reconfigures the electrical connections in response to initiating the state changing event.

2. The time controlled electrical switch according to claim 1, wherein the timing information, the calendar information, the geographic location of the time controlled electrical switch, and the predetermined rules are transmittable to, and storable in, the processor.

3. The time controlled electrical switch according to claim 1, wherein the processor is configured with a port through which the timing information, the calendar information, the geographic location of the time controlled electrical switch, and the predetermined rules are transmittable to, and storable in, the processor.

4. The time controlled electrical switch according to claim 1, wherein the time supplying device is housed within a casing of the time controlled electrical switch.

5. The time controlled electrical switch according to claim 1, further comprising a pushbutton for changing a mode of the time controlled electrical switch, upon being depressed, from a normal mode to an automatic mode during which a logical circuit within the time controlled electrical switch is operable to initiate the state changing event, or from the automatic mode to the normal mode.

6. The time controlled electrical switch according to claim 1, wherein the switching component includes a relay.

7. The time controlled electrical switch according to claim 1, wherein the processor additionally polls the time supplying device for the current time.

8. The time controlled electrical switch according to claim 1, additionally comprising a terminal in electronic communication with the switching component, the terminal configured for providing electrical communications to the external device over the electrical connections.

9. The time controlled electrical switch according to claim 1, wherein the predetermined rules include a period of time prior to a sunset for setting the onset of the Sabbath and a period of time after the sunset for setting the conclusion of the Sabbath.

10. The time controlled electrical switch according to claim 1, wherein the communication unit is additionally configured to communicate with a global positioning system and/or a server remote to the time controlled electrical switch.

11. A method comprising:
by a processor:
responding to a current time sent by a time supplying device by applying predetermined rules for initiating a state changing event associated with a Sabbath state and a working day state for a switching component for at least one of: 1) selectively directing a supply of electrical power, or 2) selectively transmitting a logical input to a device external to the switching component over electrical connections between the switching component and the external device;
controlling the electrical connections such that the at least one of the: 1) selectively directed supply of electrical power, or 2) the selectively transmitted logical input, are indicators to the external device of either the Sabbath state or the working day state; and
transmitting a signal to the switching component, the signal for initiation of the state changing event;
by a communication unit:
receiving timing information, calendar information, a geographic location of the switch, and the predetermined rules; and,
by the switching component:
responding to receiving the signal from the processor and initiating the state changing event by automatically reconfiguring the electrical connections to indicate to the external device to at least one of: 1) switch from the Sabbath state to the working day state, or 2) switch from the working day state to the Sabbath state, wherein the signal is based on the current time, the timing information, the calendar information, the geographic location of the switch, and the predetermined rules.

* * * * *